(12) United States Patent
Morle (10) Patent No.: US 7,083,052 B1
(45) Date of Patent: Aug. 1, 2006

(54) MULTISPIRAL DVD/CD RACK

(76) Inventor: Kenneth Alexander Morle, 50 Jerome Cres. Suite 801, Hamilton (CA) L8E 1K6

( * ) Notice: Subject to any disclaimer, the term of this patent is extended or adjusted under 35 U.S.C. 154(b) by 0 days.

(21) Appl. No.: 11/133,034

(22) Filed: May 20, 2005

(51) Int. Cl.
*A47G 29/00* (2006.01)

(52) U.S. Cl. .......................... 211/40; 211/78; 211/164

(58) Field of Classification Search .................. 211/40, 211/41, 1, 56, 78, 163, 164, 131.1, 129.1; 206/309, 387; 312/9.9, 457; D6/407, 467, D6/457, 468; D26/58, 106
See application file for complete search history.

(56) References Cited

U.S. PATENT DOCUMENTS

| | | | | |
|---|---|---|---|---|
| 2,091,867 A | * | 8/1937 | Martin | 34/88 |
| 2,443,320 A | * | 6/1948 | Meyer et al. | 211/56 |
| D156,256 S | * | 11/1949 | Kivett | D6/457 |
| D167,835 S | * | 9/1952 | James | D26/58 |
| 4,580,685 A | * | 4/1986 | Jorquez | 211/56 |
| D328,674 S | * | 8/1992 | Dokoupil et al. | D6/407 |
| 5,176,264 A | * | 1/1993 | De Palma | 211/40 |
| 5,341,943 A | * | 8/1994 | Fraser | 211/40 |
| D351,513 S | * | 10/1994 | Kreppein | D6/407 |
| D357,311 S | * | 4/1995 | Yehl | D23/364 |
| D360,799 S | * | 8/1995 | Rocco et al. | D6/629 |
| 5,542,550 A | * | 8/1996 | Kakavoulis-Perera et al. | 211/40 |
| 5,553,720 A | * | 9/1996 | Dardashti | 211/40 |
| 5,560,499 A | * | 10/1996 | Dardashti | 211/40 |
| 5,618,101 A | * | 4/1997 | Yeh | 362/253 |
| D430,443 S | * | 9/2000 | Dardashti | D6/630 |
| D435,929 S | * | 1/2001 | Yeh | D26/106 |
| D448,234 S | * | 9/2001 | Lopez | D6/630 |
| 6,427,849 B1 | * | 8/2002 | Swan | 211/40 |

* cited by examiner

*Primary Examiner*—Richard E. Chilcot, Jr.
*Assistant Examiner*—Lindsay M. Maguire (57) ABSTRACT

The invention relates to the display and storage of DVDs and CDs. By staggering the DVDs/CDs on a Spiral Rack, the invention makes each DVD/CD visible and easy to identify. The two visible spaces that are created on each DVD/CD by the staggering could lead to the standardized placement of titles and feature photos on DVDs and CDs. The Spiral Rack not only stores DVDs/CDs but also displays them beautifully, for commercial purpose or at home, where the Multispiral Rack can replace a floor lamp at the corner of a room.

1 Claim, 10 Drawing Sheets

MULTISPIRAL DVD/CD RACK

CROSS-REFERENCE OF RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The invention relates to an entertainment storage unit for DVDs/CDs etc. At present DVDs/CDs are mainly stored in cabinets boxes and racks, which are mostly just storage.

DVDs/CDs are tucked away and are not very visible or easily accessible. In both home and commercial storage, the first DVD/CD totally obscure all the other DVDs/CDs behind it.

The Multispiral DVD/CD Rack solves this problem by staggering the DVDs/CDs in height and width to create a clear visible space at the top and side of each DVD/CD so that a title and a Feature photo can be seen, thereby allowing DVDs/CDs to be identified at a glance.

Not only does the Multispiral DVD/CD Rack store DVDs/CDs, it displays them beautifully in full view. This allows all the DVDs/CDs on the Multispiral Rack to be easily identified and easily accessed.

On a rotary rack the spirals would make the DVDs/CDs swirl somewhat like a barber's pole.

BRIEF SUMMARY OF THE INVENTION

The object of this invention is to allow DVDs and CDs that are stored on a rack, to be easily identified and easier to access.

This objective is achieved by staggering the DVDs/CD in height and width on a spiral rack.

At present the DVDs/CDs on a rack totally obscure all the DVDs/CDs behind them, leaving only the small outer edge exposed. This edge is too small to convey much information.

The Multispiral DVD/CD Rack solves this problem by the use of two staggers, the title stagger and feature photo stagger. These two staggers provide clear visible spaces on each DVD/CD to convey information. This could lead to the standardized placement of titles and feature photos on DVDs and CDs.

The feature photo stagger is achieved by turning the DVDs/CDs at a cant angle of about 68 degrees on the Spiral Rack. The title stagger is achieved by the incline angle of the spiral.

DVDs/CDs are kept in place by the backstops at the inner edge of the Spiral Rack, with pressure from the lock wedges at the outer edge of the Spiral Rack.

The Multispiral Rack can be made for home storage of DVDs/CDs or for commercial displays. For homes, the Spiral Rack would take on the appearance of furnishing, with the dusthood-lamp shade and lights, it could replace a floor lamp at the corner of a room.

BRIEF DESCRIPTION OF THE SEVERAL VIEWS OF THE DRAWING

Referring to the drawings in which the invention is depicted; however, the invention is not limited to these exact illustrations.

The solid black areas in the figures represent the color black.

DETAILED DESCRIPTION OF THE INVENTION

Figure 1:
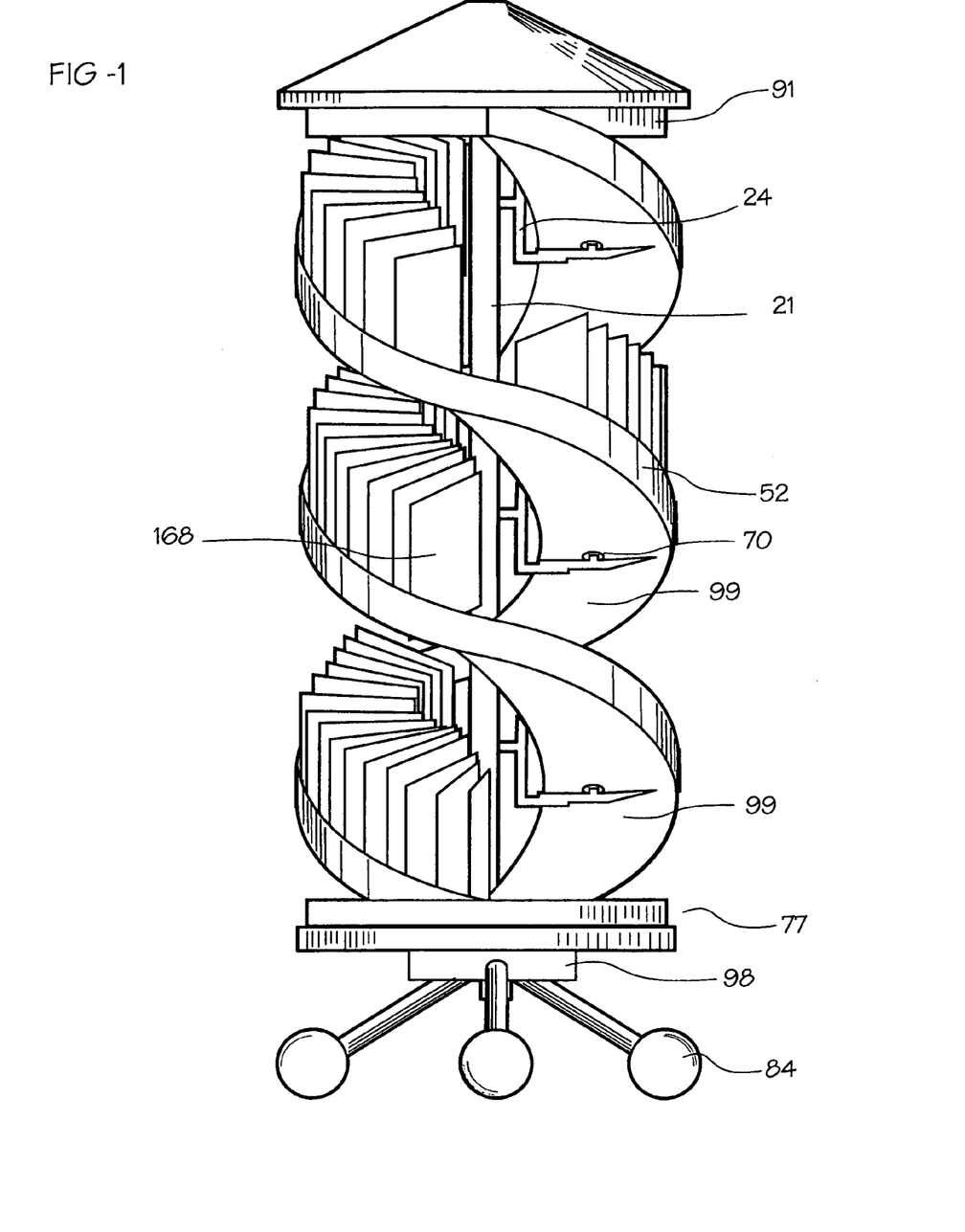
FIG. 1 is a front elevation of the Multispiral DVD/CD Rack, with DVDs in place.
Figure 2:
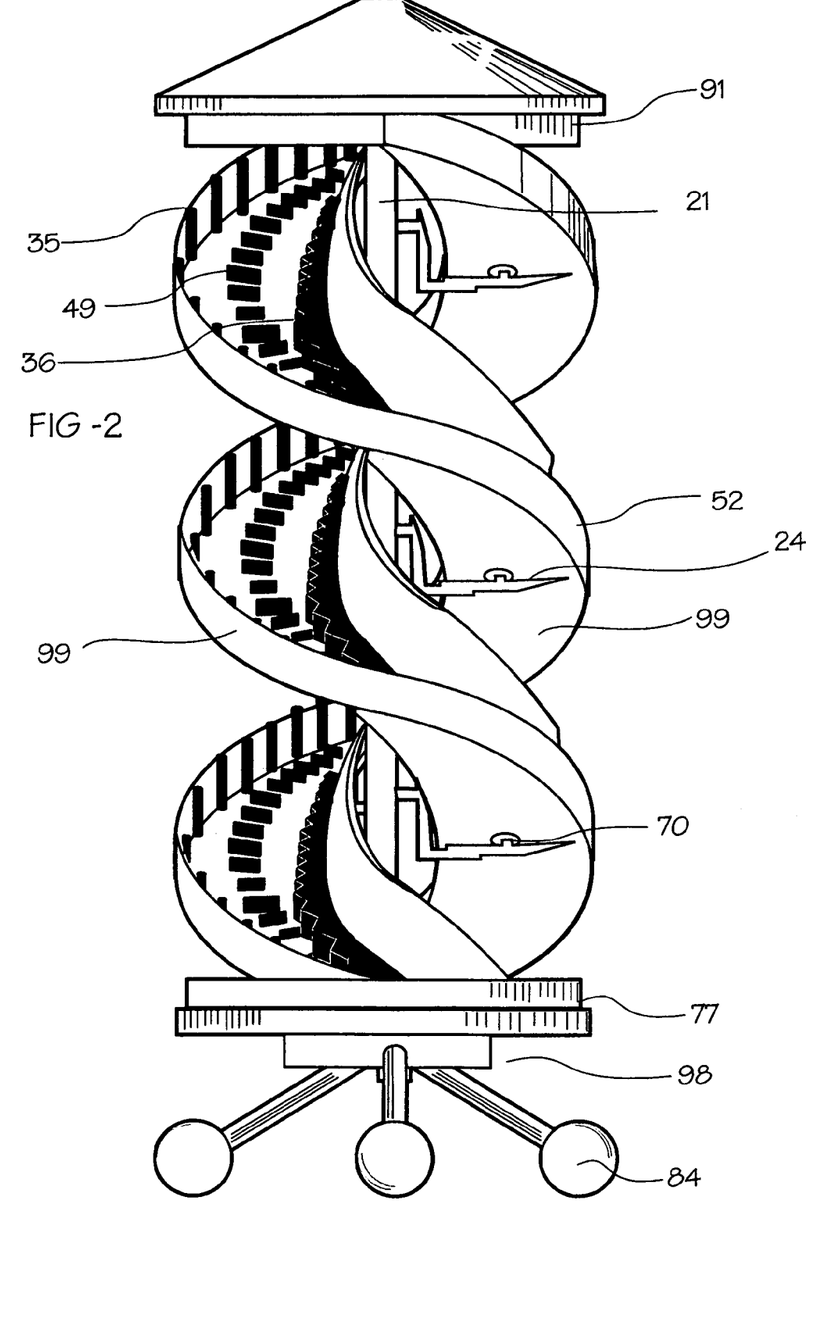
FIG. 2 is a view of FIG. 1 without DVDs.
Figure 3:
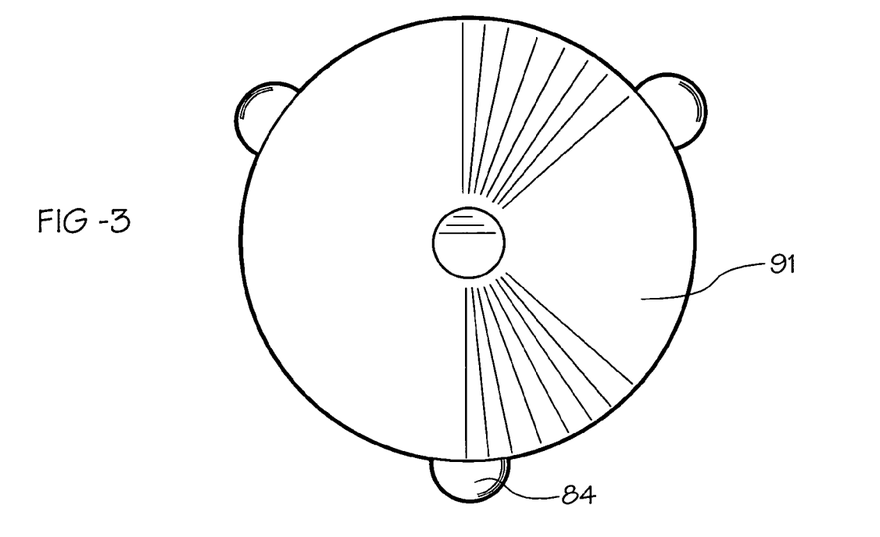
FIG. 3 is a top plan view of FIG. 1.

The Multispiral Rack 52 FIG. 2 consists of Dusthood-lamp shade 91, spiral rack assembly comprising two racks 99 52, backstops 36, spacers 49, lock wedges 35, central column 21, support arms 24, support plate 77, ball bearing 98, and feet 84.

Figure 6:
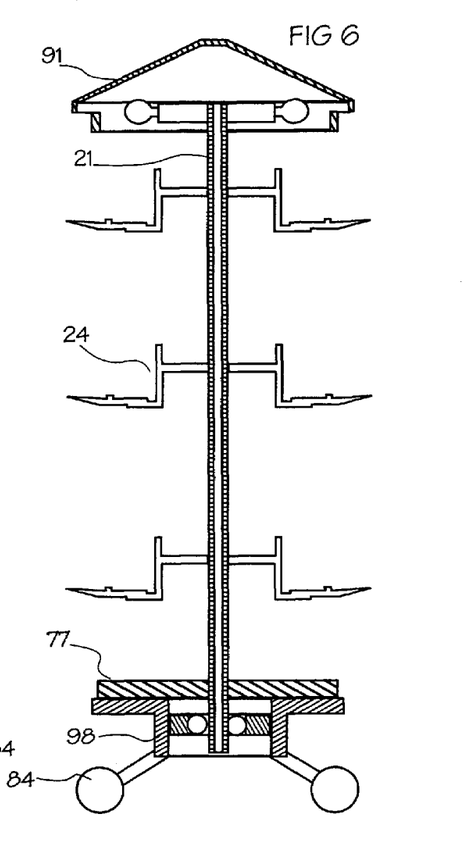
FIG. 6 is a cross-sectional view of FIG. 5 taken along line 6—6.
Figures 7, 9:
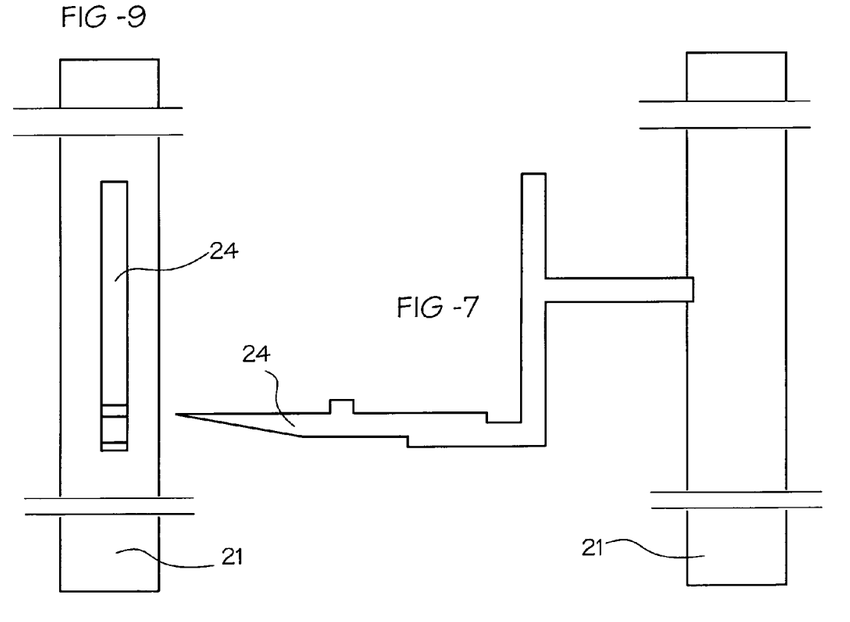
FIG. 7 is a side view of a support arm and central column.
FIG. 9 is a front elevation of FIG. 7.
Figure 8:
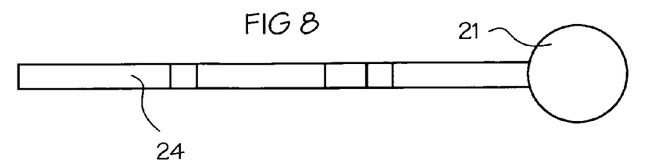
FIG. 8 is a top plan view of FIG. 7.
Figure 10:
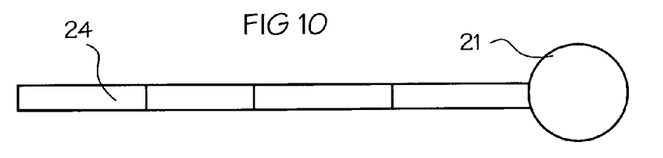
FIG. 10 is a bottom plan view of FIG. 7.
Figure 11:
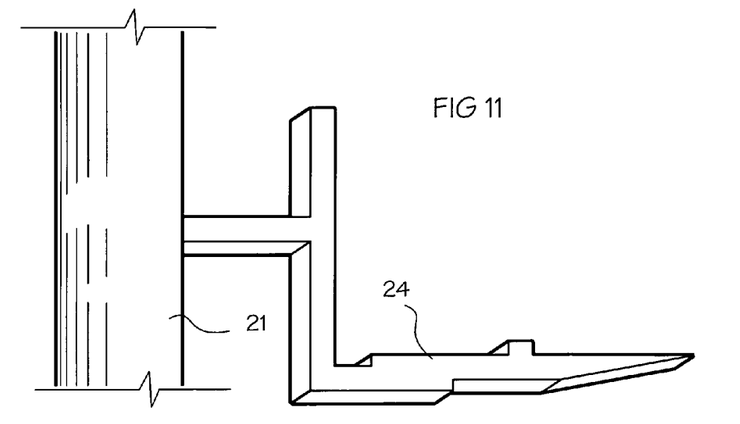
FIG. 11 is a perspective view of FIG. 7.
Figure 12:
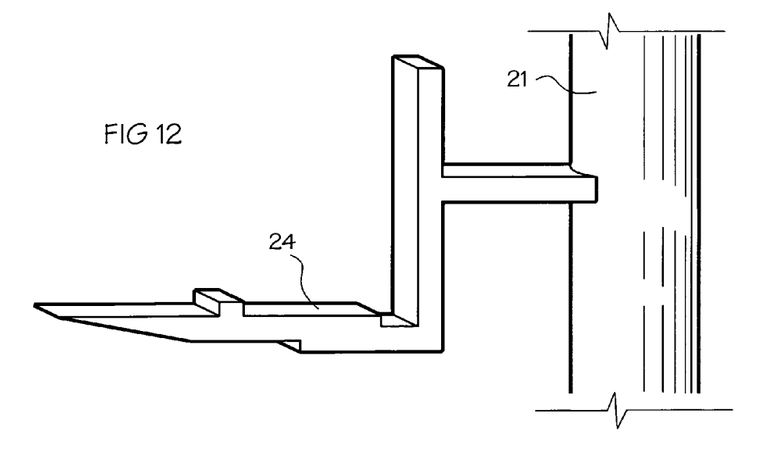
FIG. 12 is another perspective view of FIG. 7.

The dusthood-lamp shade 91 gives protection from dust and provides light FIG. 6 to illuminate the DVDs 168 on the Spiral Rack 52 or provide general lighting for a room.

Figure 13:
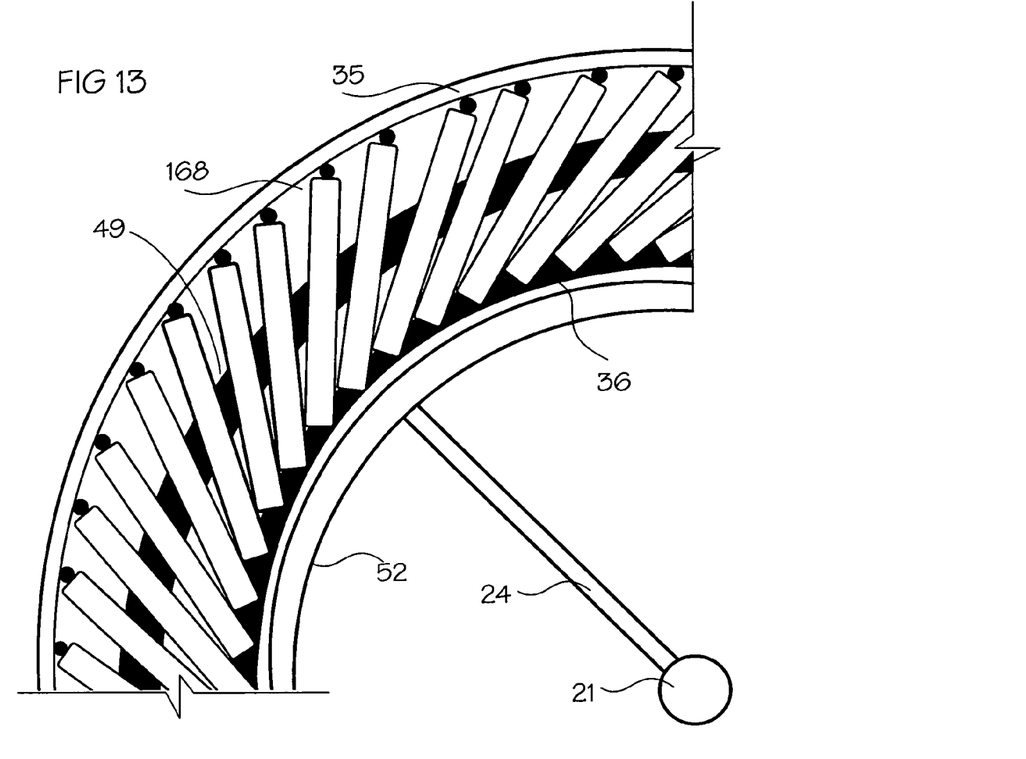
FIG. 13 is a detailed plan view of the spiral rack with DVDs in place.
Figure 14:
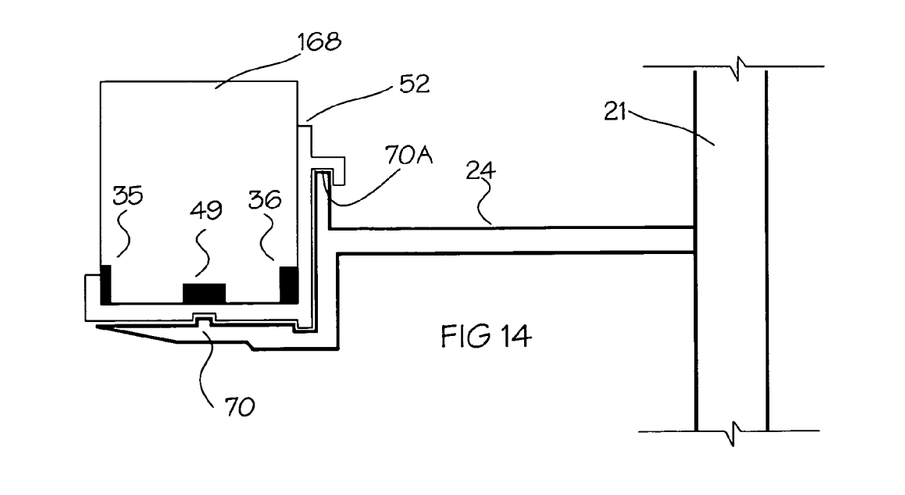
FIG. 14 is a front elevation of FIG. 13.
Figure 15:
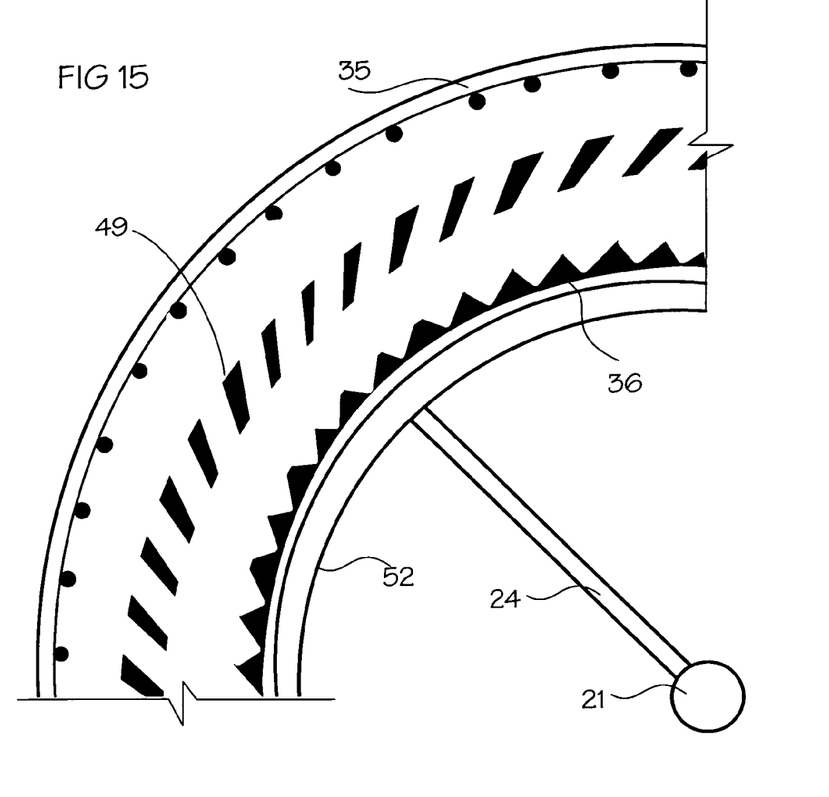
FIG. 15 is a view of FIG. 14 without DVDs.
Figure 16:
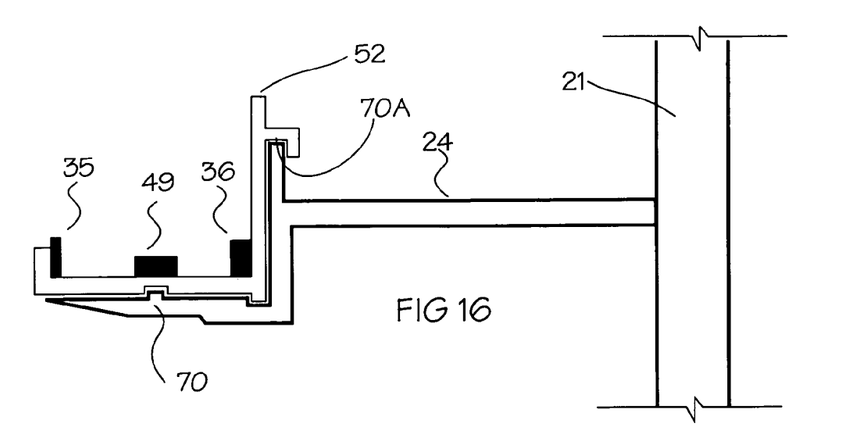
FIG. 16 is a front elevation of FIG. 15.

The Spiral Rack 52 depicted is of moulded plastic with backstops 36, spacers 49 and lock wedges 36 of rubber, that are of an height of about 0.75 of an inch FIG. 16. DVDs 168 slide between the spacers 49 FIG. 15 and butts against the backstops 36. When the DVD 168 is lowered the lock wedge 35 exerts pressure to lock the DVD 168 in place against the backstop 36, FIGS. 13–14. Lifting a DVD about 0.75 of an inch, clears the lock wedge 35 and the DVD 168 is free for removal from the Spiral Rack 52.

Figure 17:
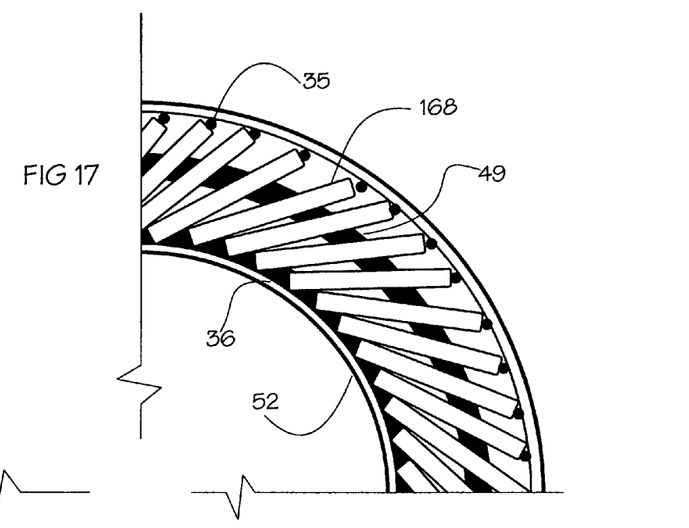
FIG. 17 is an alternate plan view of FIG. 13, showing DVDs in single file placement.
Figure 18:
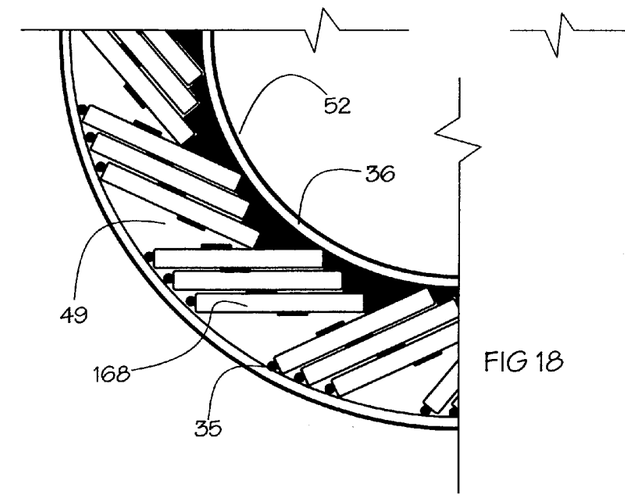
FIG. 18 is an alternate plan view of FIG. 17, showing DVDs in sets of three placement.
Figure 19:
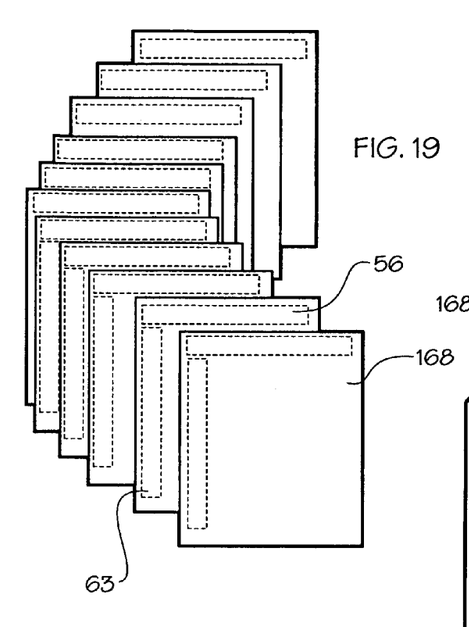
FIG. 19 is a perspective view of DVDs with title stagger and feature photo stagger marked.
Figure 20:
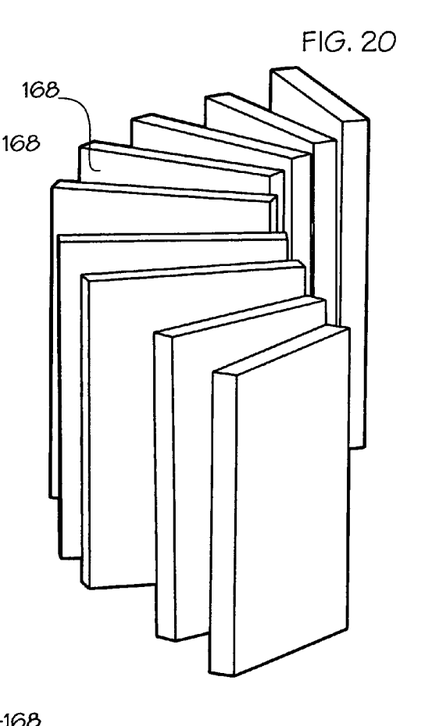
FIG. 20 is another perspective view of DVDs.
Figure 21:
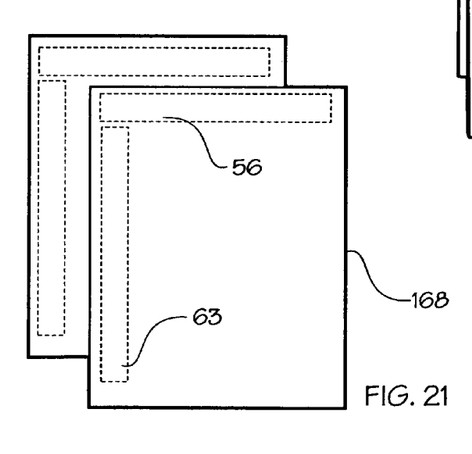
FIG. 21 is a front elevation of DVDs with title stagger and feature photo stagger marked.

Positioning and spacing of DVDs/CDs may vary, from continuous single file FIG. 17 to sets of 3, FIG. 18 or sets of 4 or 5, which would be suitable for commercial displays.

On its spiral traverse around the steel tube central column 21 the Spiral Rack 52 FIG. 2 is supported by support arms 24, FIGS. 9–12 that are inserted into slots 70 at the bottom of the rack 52 and 70A, at the inner edge of the rack 52, FIGS. 2–16. The support arms 24 are of metal and are connected to the steel tube central column 21 at various points along the Spiral Rack 52, FIGS. 2–5.

Figure 4:
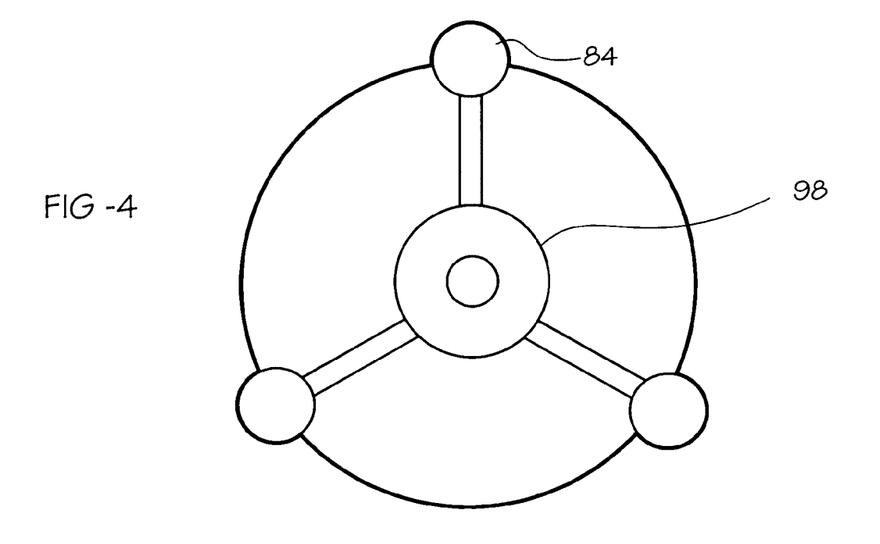
FIG. 4 is a bottom plan view of FIG. 1.
Figure 5:
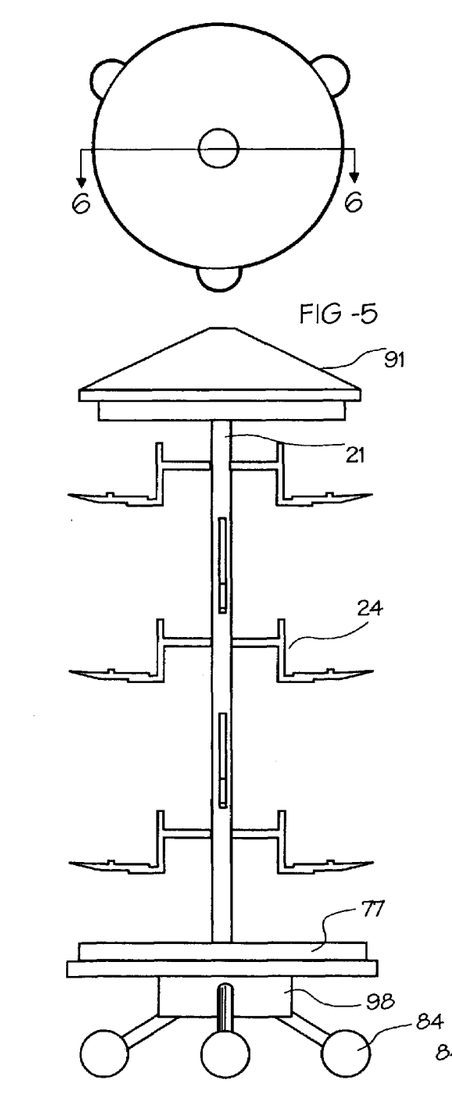
FIG. 5 is a front elevation of FIG. 1, without spiral rack.

A support plate 77 of moulded plastic, supports the ends of the Spiral Rack 52 which inturn is supported by three feet of steel 84, FIG. 4, that stabilize the Multispiral Rack 52. In the central hub of the three feet 84 is a ball bearing 98 FIG. 6 that gives rotation to the central column 21 and thus the Multispiral Rack 52.

Rotating the Multispiral Rack 52 gives the effect of a swirling motion to the DVDs 168 in place on the rack 52, that is much like a barber's pole.

The swirling effect is caused by the spiral, the title stagger 56 and feature photo staggers 63, FIGS. 1–19 and 21. The title stagger 56 is provided by the incline angle of the spiral and the feature photo stagger 63 is attained by placing the DVDs 168 on the Spiral Rack 52 at a cant angle FIG. 13 of about 68 degrees. Thus the DVDs/CDs proceed along the spiral exhibiting titles and feature photos.

It should be understood that both the diameter and numbers of spirals of the rack may be increased to provide a rack with greater storage capacity for commercial DVD/CD displays.

The base of a commercial rack would differ from the one depicted, in that it may be stationary, in concern for customer safety etc. Should rotation be required; with the increased size of the rack, rollers or wheels on the perimeter of the base would suffice.

Single spiral racks for small quantity home storage and display can be made with rotary or stationary bases.

Although the rack that is shown, is of moulded plastic, the rack could be fabricated from wire guage etc.

The support arms may be attached to the central column by many methods, such as threads, mortise and tenon, screws, weld etc. This would mainly be determined by how the rack is to be sold; pre-assembled or after sale assembly etc.

Although the invention has been depicted and described, it is understood that changes in sizes and materials can be made without departing from the invention. Hereafter follows the claims.

I claim:

1. A multi-spiral rotating DVD/CD rack comprising:

a support plate having a top and a bottom side; three support feet having a central support hub disposed on said bottom side of said plate;

a central column having a top and a bottom that is disposed centrally on the top of said plate;

said central hub housing a ball bearing that facilitates rotation of said central column;

a dust hood-lamp shade with lights that is adapted to illuminate the DVD's/CD's;

said dust hood-lamp shade is attached to the top of said central column;

support arms attached to said central column, at intervals along said central column;

a spiral rack assembly placed on said support arms which comprises two racks spiraling in opposite directions along the central column, and is attached to the top of said support plate;

and rubber wedges which are placed at intervals along the racks to hold the DVD's/CD's in place at a cant angle of 68 degrees, thereby allowing both the tops and sides of each DVD/CD to be seen.

* * * * *